United States Patent [19]

Klaren et al.

[11] Patent Number: 4,744,413

[45] Date of Patent: May 17, 1988

[54] APPARATUS FOR CARRYING OUT PHYSICAL AND/OR CHEMICAL PROCESSES, IN PARTICULAR A HEAT EXCHANGER

[75] Inventors: Dick G. Klaren; Zacharias L. Nunninga, both of Hillegom, Netherlands

[73] Assignee: Eskla B.V., Halfweg, Netherlands

[21] Appl. No.: 101,437

[22] Filed: Sep. 28, 1987

[30] Foreign Application Priority Data

Sep. 30, 1986 [NL] Netherlands ........................ 8602463

[51] Int. Cl.⁴ .......................... F28C 3/16; F28D 19/02
[52] U.S. Cl. ........................... 165/104.16; 165/104.18; 422/143; 422/146
[58] Field of Search ....................... 165/104.16, 104.18, 165/104.15; 422/146; 34/57 A

[56] References Cited

U.S. PATENT DOCUMENTS 4,427,053 1/1984 Klaren ................................. 422/146
4,554,963 11/1985 Goodwin et al. ............... 165/104.16

*Primary Examiner*—Albert W. Davis, Jr
*Attorney, Agent, or Firm*—Stevens, Davis, Miller & Mosher

[57] ABSTRACT

Apparatus for carrying out physical and/or chemical processes has a lower chamber, an upper chamber, vertical riser tubes for the passage of a first fluid medium from the lower chamber to the upper chamber and an intermediate chamber through which the riser tubes exetend so that a second fluid medium can contact the riser tubes. A granular mass is fluidized in at least the riser tubes by the flow of the first medium. A vertical gravity tube for return passage of the granular mass from the upper to the lower chamber has an outlet below the inlets of the riser tubes. A distribution plate for the first medium is mounted in the lower chamber between the inlets of the riser tubes and the outlet of the gravity tube. To allow the granular mass to fall below the distribution plate for start-up of the apparatus the gravity tube has, at least one opening connecting to the lower chamber above the distribution plate.

5 Claims, 2 Drawing Sheets

APPARATUS FOR CARRYING OUT PHYSICAL AND/OR CHEMICAL PROCESSES, IN PARTICULAR A HEAT EXCHANGER

BACKGROUND OF THE INVENTION

1. FIELD OF THE INVENTION

The invention relates to apparatus for carrying out physical and/or chemical processes, in particular but not exclusively, a heat exchanger of the continuous type.

2. DESCRIPTION OF THE PRIOR ART

EP-A No. 132873 describes apparatus for carrying out physical and/or chemical processes which has a lower chamber and an upper chamber connected by a plurality of vertical riser tubes for passage of a first medium, e.g. first heat exchanging medium. Between the lower and upper chambers is an intermediate chamber for a second medium, e.g. second heat exchanging medium, which contacts the riser tubes. A fluidisable granular mass (i.e. a mass of separate particles) is present and in use is fluidised at least in the riser tubes by the flow of the first medium. One or more gravity tubes are provided for the return of the granular mass from the upper chamber to the lower chamber and extend to a lower level in the lower chamber than the riser tubes. A distribution plate for the first medium is located in the lower chamber at a level between the inlets of the riser tubes and the outlet of the gravity tube(s). The distribution plate has apertures for the passage of the first medium and the granular mass.

Various embodiments of the apparatus are disclosed in EP-A No. 132873, to all of which the present invention is applicable. For example, it is possible to fit one or more distribution devices for the first medium underneath in the lower chamber. In addition specially adapted shapes can be given to the bottom ends of the riser tubes, or the gravity tubes, depending on the required operational control.

The apparatus of EP-A No. 132873 is operated with a circulating granular mass fluidised at least in the riser tubes by the first medium. The granular mass rises up through the riser tubes, and falls again from the upper chamber into the lower chamber through the gravity tube or tubes. The importance of circulation flow of the mass via a gravity tube has already been described elsewhere for example in EP-A No. 132873. It is important that the granular mass returned to the lower chamber is delivered below the distribution plate, so that, together with the flow of the first medium, it is fed to the riser tubes evenly distributed by the distribution plate.

It is very important that during startup, after shut-down of the apparatus, the granular mass is all at the low level in the apparatus. This means that, when re-starting the flow of the first medium, the granular mass can move freely to beneath the distribution plate. In various embodiments of the distribution plate for evenly distributing the first medium to the riser tubes, this does cause a problem, for example when the distribution plate is fitted with a larger number of relatively small holes to let the fluid and granular mass pass through, or the openings of the distribution plate are fitted with means for deflecting the direction of flow from the vertical direction.

SUMMARY OF THE INVENTION

The present invention aims to solve this problem, in particular to improve the return of the granular mass to below the distribution plate for restart of operation of the apparatus.

The invention consists in that the gravity tube has, for the passage of the granular mass, at least one opening connecting to the lower chamber above the distribution plate. By means of this extra opening, after shut-down of operation of the apparatus the granular mass can pass via the gravity tube to below the distribution plate. Where there are a plurality of gravity tubes, at least one of them has such an opening above the distribution plate.

This opening or openings above the distribution plate may be an aperture or apertures in the gravity tube wall, but it is preferable and more simple if the gravity tube is completely broken above the distribution plate i.e. the gravity tube has an upper portion and a lower portion separated by a gap. In order nevertheless to achieve good operaton of the gravity tube over its whole length it is preferred that the lower portion of the broken gravity tube is at least as wide as the upper portion. Very good results are achieved where the upper portion extends into the lower portion.

BRIEF INTRODUCTION OF THE DRAWINGS

Preferred embodiments of the invention will now be described by way of non-limitative example with reference to the accompanying drawings, in which:

FIG. 1 shows, in schematic vertical section, a heat exchanger of the prior art, and FIG. 2 shows a detail from FIG. 1 on an enlarged scale, in which the invention is applied.

DESCRIPTION OF THE PREFERRED EMBODIMENTS

Figure 1:
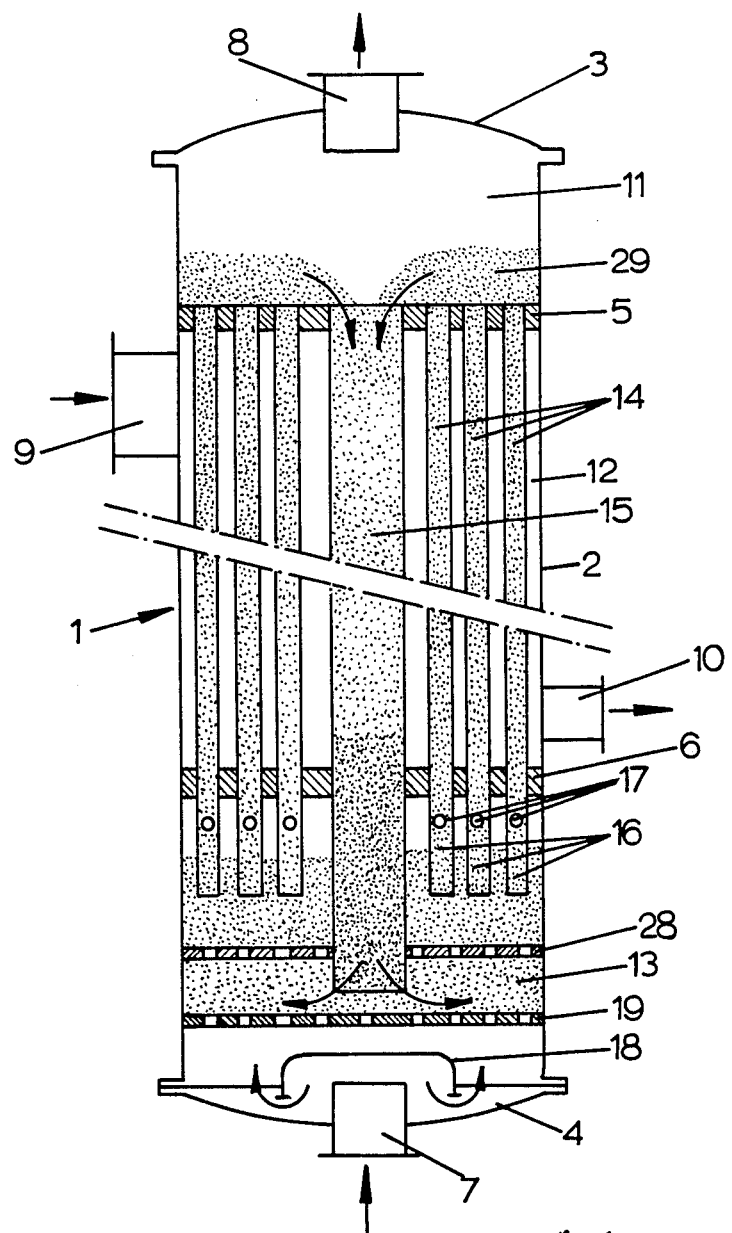

In FIG. 1, which represents the known state of the art, the heat exchanger 1 has a casing 2, which is closed at the top and bottom by domed ends 3 and 4 respectively. A first heat exchanging medium is fed in at an inlet 7 and discharged via an outlet 8. A second heat exchanging medium can be fed in at inlet 9 and discharged through outlet 10.

Within the heat exchanger are fitted two tube or pipe plates 5 and 6 which form separations between respectively an upper chamber 11, and intermediate chamber 12 and a lower chamber 13. In the tube plates 5 and 6 riser tubes 14 and one gravity tube 15 are fixed. The gravity tube 15 extends deeper into the lower chamber 13. The riser tubes 14 are fitted at their bottom ends with extended inlet pices 16 which are fitted with side holes 17; this feature seems to improve the operation of the heat exchanger, but is not essential to the present invention. Between the bottom ends of respectively the riser tubes 14 and the gravity tube 15, a distribution plate 28 is fitted. A second distribution plate 19 and a flow baffle 18 are illustrated as in many cases they can contribute to improving the process control. For the operation of the present invention they are however also not essential. The distribution plate 28 has apertures 20 for the passage of the first medium. Reference should be made to EP-A No. 132873 for fuller description of the construction and operation of the apparatus.

The heat exchanger contains a granular mass 29 which can be located above the second distribution plate 19 in the lower chamber 13, the riser tubes 14, the upper chamber 11 and the gravity tube 15. When no first heat exchanging medium is passing through the device the granular mass 29 will all fall down and thereby only fill part of the lower chamber and the tubes (see FIG. 2). During operation the granular mass is brought into the fluidised state by the flowing first medium, at least in the riser tubes, but often in the other places indicated within the heat exchanger. During this the granular mass rises in the riser tubes and falls through the gravity tube back into the lower chamber. As a result of the relatively high velocities in the apertures of the distribution plate 28 no grains can fall down through this. On the other hand, the apertures in the distribution plate 28 need to be large enough so that they do not hinder the transport of grains.

The apparatus described seems to be able to operate well if, before complete restart of the flow of the first heat exchanging medium, the grains can fall freely to below the distribution plate 28.

Problems occur where the distribution plate 28 is fitted with a large number of relatively small apertures, or when these apertures are fitted on their top side with means for deflecting the direction of flow from the vertical direction.

Figure 2:
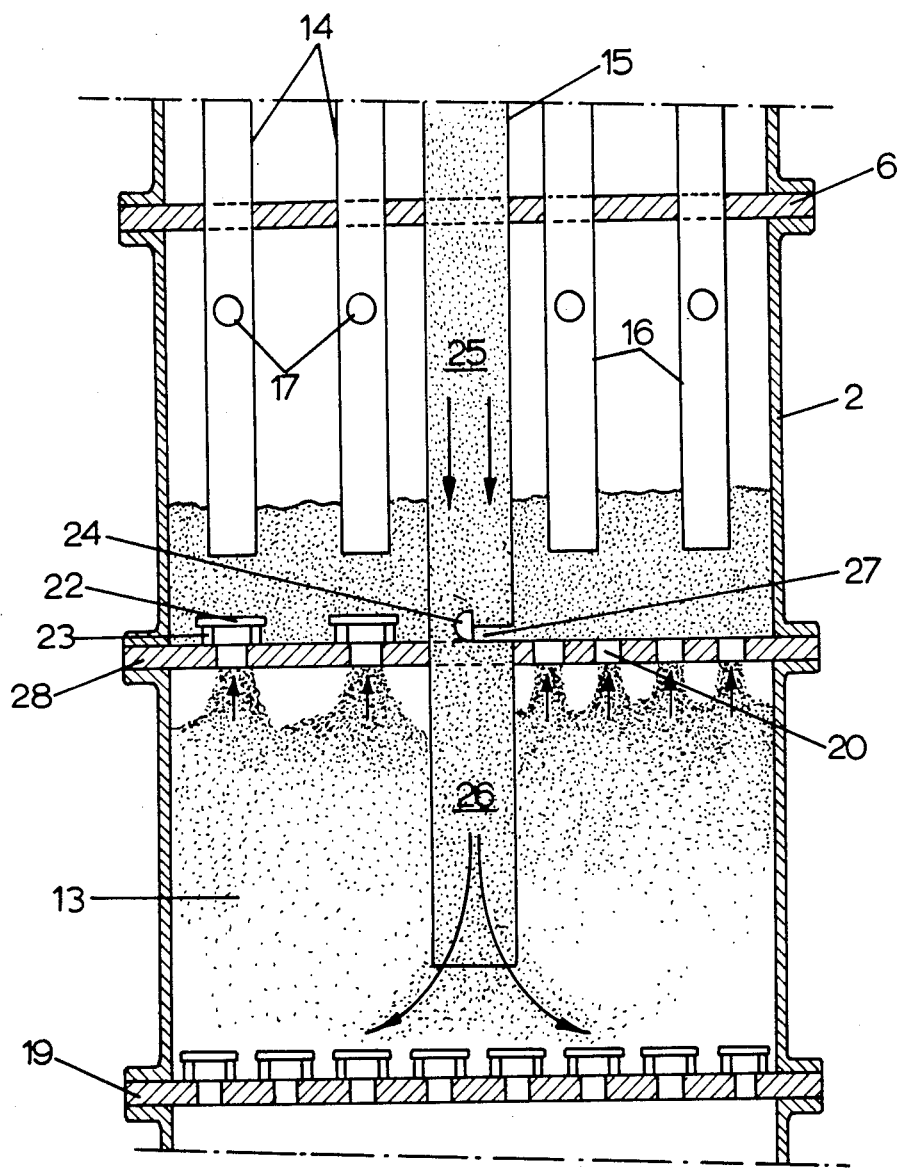

FIG. 2 shows a part of the apparatus of FIG. 1 between the tube plate 6 and the second distribution plate 19 on an enlarged scale. Two different embodiments in accordance with the present invention are shown in this Figure. Of course in practice only one of these embodiments need be used in one single device.

Reference numbers 2,6,13 to 17,19 and 28 in FIG. 2 are elements corresponding to those in FIG. 1, although on a different scale and partly in a different arrangement or in different numbers. These differences are not material to the concept of the invention.

When the granular mass falls down, when the flow of the first heat exchanging medium comes to a standstill, it must be possible for the granular mass to move to below the distribution plate 28. Depending on the size of the grains relative to the size of the apertures 20, and the design form of inset pieces 23 and disks 22 (which are shown at the left hand side of FIG. 2 and have the function of diverting laterally the flow of the first medium), this may cause problems of greater or lesser magnitude. In FIG. 2 there are shown two different forms of the design of the gravity tube 15 immediately above distribution plate 28 to solve this problem. These two different forms of construction are shown on either side of the vertical centre line of this gravity tube 15. On the left of the centre line it is shown that one or more holes 24 are made in the wall of gravity tube 15, through which holes 24 the granular mass can fall into the gravity tube, and from there can move down and spread over the second distribution plate 19.

On the right hand side of the centre line in the gravity tube 15 an alternative is shown, in which the gravity tube is subdivided into two portions i.e. upper portion 25 which extends to close above the distribution plate 28 and lower portion 26 which extends downwards from the distribution plate 28. The lower portion 26 has a rather larger diameter than the top portion 25. (This is not shown in the Figure). Between the portions 25 and 26 there is a gap 27 through which the granular mass can pass to above the second distribution plate 19.

Both arrangements illustrated for the openings in the gravity tube 15 above the distribution plate 28 improve the start-up of operation of the apparatus.

What is claimed is:

1. Apparatus for carrying out physical and/or chemical processes, comprising
   (a) a lower chamber,
   (b) an upper chamber,
   (c) a plurality of vertical riser tubes connecting the lower chamber to the upper chamber for the passage in use of a first fluid medium from the lower chamber to the upper chamber, said riser tubes having inlets in the lower chamber and outlets in the upper chamber,
   (d) an intermediate chamber which is between the lower chamber and the upper chamber and through which the riser tubes extend so that in use a second fluid medium in the intermediate chamber can contact the riser tubes,
   (e) a granular mass which in use is present in the lower chamber, the upper chamber and the riser tubes and is fluidized in at least the riser tubes by the flow of the first medium,
   (f) for return passage of the granular mass from the upper chamber to the lower chamber, at least one vertical gravity tube which connects the upper chamber to the lower chamber and has an outlet at a lower level in the lower chamber than the inlets of the riser tubes, and
   (g) a distribution plate for the first medium having a plurality of openings for passage of the first medium and the granular mass mounted in the lower chamber at a level between the inlets of the riser tubes and the outlet of the gravity tube
   and wherein the said gravity tube has, for passage of the granular mass, at least one opening connecting to the lower chamber above the distribution plate.

2. Apparatus according to claim 1 wherein the gravity tube has an upper portion and a lower portion which are separated from each other by a gap providing said opening above the distribution plate.

3. Apparatus according to claim 2 wherein the lower portion of the gravity tube is at least as wide as the upper portion.

4. Apparatus according to claim 3 wherein the upper portion of the gravity tube extends into the lower portion.

5. Apparatus according to claim 1 wherein the openings of the distribution plate have, at the upper side of the plate, means for deflecting the flow of the first medium from the vertical direction.

* * * * *